United States Patent

Strankman

Patent Number: 6,039,002
Date of Patent: Mar. 21, 2000

[54] MOVING HEAD GATE FEEDING APPARATUS

[76] Inventor: Douglas R. Strankman, P.O. Box 250, Blackfalds, Alberta, Canada, T0M 0J0

[21] Appl. No.: 09/272,771

[22] Filed: Mar. 19, 1999

[51] Int. Cl.[7] .................................................. A01K 5/00
[52] U.S. Cl. ............................................ 119/57.1; 119/60
[58] Field of Search .................................. 119/57.1, 52.4, 119/58, 60, 738, 739

[56] References Cited

U.S. PATENT DOCUMENTS

| | | | |
|---|---|---|---|
| 3,030,920 | 4/1962 | Hibbert et al. | 119/60 |
| 4,009,687 | 3/1977 | Korthals | 119/60 |
| 4,419,963 | 12/1983 | Willibrordus | 119/58 |
| 5,054,430 | 10/1991 | Weelink | 119/60 |
| 5,067,442 | 11/1991 | Schilling | 119/60 |
| 5,205,241 | 4/1993 | Halpin et al. | 119/60 |
| 5,303,673 | 4/1994 | Weelink | 119/60 |
| 5,355,834 | 10/1994 | Blazek | 119/60 |
| 5,433,172 | 7/1995 | Weelink | 119/60 |

*Primary Examiner*—Peter M. Poon
*Assistant Examiner*—Elizabeth Shaw
*Attorney, Agent, or Firm*—Miles & Stockbridge P.C.; John C. Kerins

[57] ABSTRACT

A head gate for use in controlling access of livestock to feed exposed at an open end of an elongated agricultural storage bag of the type formed of tubular flexible sheet plastic. The head gate includes a framework having a central portion which extends across in front of the open end and is provided with a number of openings sized to permit the livestock to reach through and feed from a face of compacted feed within the bag, the framework being mounted on skids to allow the head gate to be shoved towards the open end of the bag. Sheet plastic storage rolls are mounted on the framework and have a drive system to rotate the rolls relative to the framework for gathering the sheet material which had formed the bag and becomes excess as the feed recedes from the open end. The head gate allows for use of the feed directly from the bag with little labour involved while maintaining the feed clean and preventing wastage. After the stored food of the bag is completely consumed the sheet plastic of the bag which has been maintained in a neatly stored condition can be easily removed for disposal.

24 Claims, 6 Drawing Sheets

MOVING HEAD GATE FEEDING APPARATUS

FIELD OF THE INVENTION

This invention relates to a head gate apparatus for controlling the feeding of livestock from stored feed, and more particularly to a head gate for allowing livestock to feed on silage and the like directly from an open end of an agricultural feed storage bag in which such feed is maintained.

BACKGROUND OF THE INVENTION

There exists various designs of feeders, some of which are moveable to allow livestock to reach through the feeder from a roaming area to a supply of feed, such as a stack on the opposite side of the feeder. Such a feeder otherwise prevents cattle and the like from trampling and dirtying the feed. This type of feeder is shown in U.S. Pat. No. 3,030,920, Apr. 24, 1962, Hibbert. More elaborate types of such feeders, which are used to separate a feed area from the area occupied by the cattle while allowing the cattle to progressively feed through the feed from a pile of feed on the opposite side of the feeder, are sometimes motorized to allow the feeder to be moved relative to the feed area, the feeder thereby being movable towards the feed during feeding and/or being retractable from the feed area when it is to be refilled. Examples of such feeders are shown in a number of patents to Weelink, including U.S. Pat. No. 5,054,430, Oct. 8, 1991; U.S. Pat. No. 5,303,673, Apr. 19, 1994; and U.S. Pat. No. 5,433,172, Jul. 18, 1995.

A now commonly used practice of making and storing feed, such as silage, involves packing cut forage into an elongated tubular plastic bag extending along the ground surface. The most common practice of feeding cattle and the like from the bag is to remove the forage from an open end of the bag with a front end loader and deposit the silage in a feed area, feed trough, or conveyor associated with a feed system for the livestock. Alternatively, the loader may dump the silage in a feed wagon which is drawn to a feed area of the livestock or the loader may simply dump the feed on the ground for the livestock. In order to reduce handling costs, an end of the bay may be opened, and the livestock are simply allowed access to the silage at the open end. This latter approach results in considerable wastage and unclean eating conditions as the loose feed is trampled and covered with manure. Furthermore, the area becomes difficult to maintain as the loose exposed plastic of the bag separates from the feed and is trampled by the livestock or blown about.

SUMMARY OF THE INVENTION

It is an object of the present invention to provide a head gate which can be moved into position at an open end of an agricultural feed storage bag so as to provide controlled access to the feed within the bag and thereby reduce handling costs while presenting clean feed and reduced wastage.

According to the present invention there is provided a feed head gate for allowing livestock to feed from an open end of an elongated agricultural storage bag of the type formed of tubular flexible sheet plastic, the feed head gate including an elongated framework which has ground engaging means for mounting the framework in front of an open end of the bag and transverse to a longitudinal axis of the bag in a manner to prevent the free passage of the livestock from a rear side of the framework to the open end of the bag. The framework has a portion thereof defining a plurality of openings which allow the livestock to reach through the framework from the rear side exposed to the livestock to a front side of the framework facing the open end of the bag. The feed head gate has a sheet plastic storage means mounted on the framework and extending at least a portion of the length of the framework. Drive means are provided for activating the storage means to thereby gather sheet plastic of the bag as feed is consumed from the open end of the bag.

In a preferred embodiment of the present invention, the storage means includes at least one elongated roll means mounted for rotation on the framework and extending perpendicular to the longitudinal axis of the bag, and the drive rotating means includes means for turning the roll means in a winding direction so as to wrap the sheet plastic on the roll means.

According to a specific embodiment of the invention, the storage means includes a pair of roll means mounted for rotation on the framework. An upper one of the roll means is disposed above the opening defining portion of the framework and a lower one of the roll means is disposed below the opening defining portion of the framework, each of the roll means having a longitudinal axis thereof extending normal to the longitudinal axis of the bag. The bag may therefore be slit longitudinally on either side of the bag in front of the feed head gate so as to form separated upper and lower sheets of plastic. Thus, the upper sheet thereby formed is wound on the upper roll means and the lower sheet thus formed is wound on the lower roll means, so that feed at the open end of the bag between the upper and lower sheets is exposed to the opening defining portion of the framework at the front side of the framework.

The feed which can be consumed by the livestock reaching through the openings is freshly exposed from the stored contents of the bag as the feed head gate moves towards the open end of the bag in the direction of the longitudinal axis of the bag, and the sheet plastic forming the bag is accumulated in an orderly fashion. The feed thus available to the livestock does not become contaminated or wasted, and subsequent to the feed being completely consumed from the bag, the waste sheet plastic can be removed from the storage means for disposal. The amount of labour involved in feeding the livestock directly from the bag is minimal requiring only periodical checking and adjustment as will become apparent from the following detailed description of the invention.

BRIEF DESCRIPTION OF DRAWINGS

In the accompanying drawings which illustrate an embodiment of the present invention, as an example.

DETAILED DESCRIPTION OF PREFERRED EMBODIMENTS OF THE INVENTION

Figure 2:
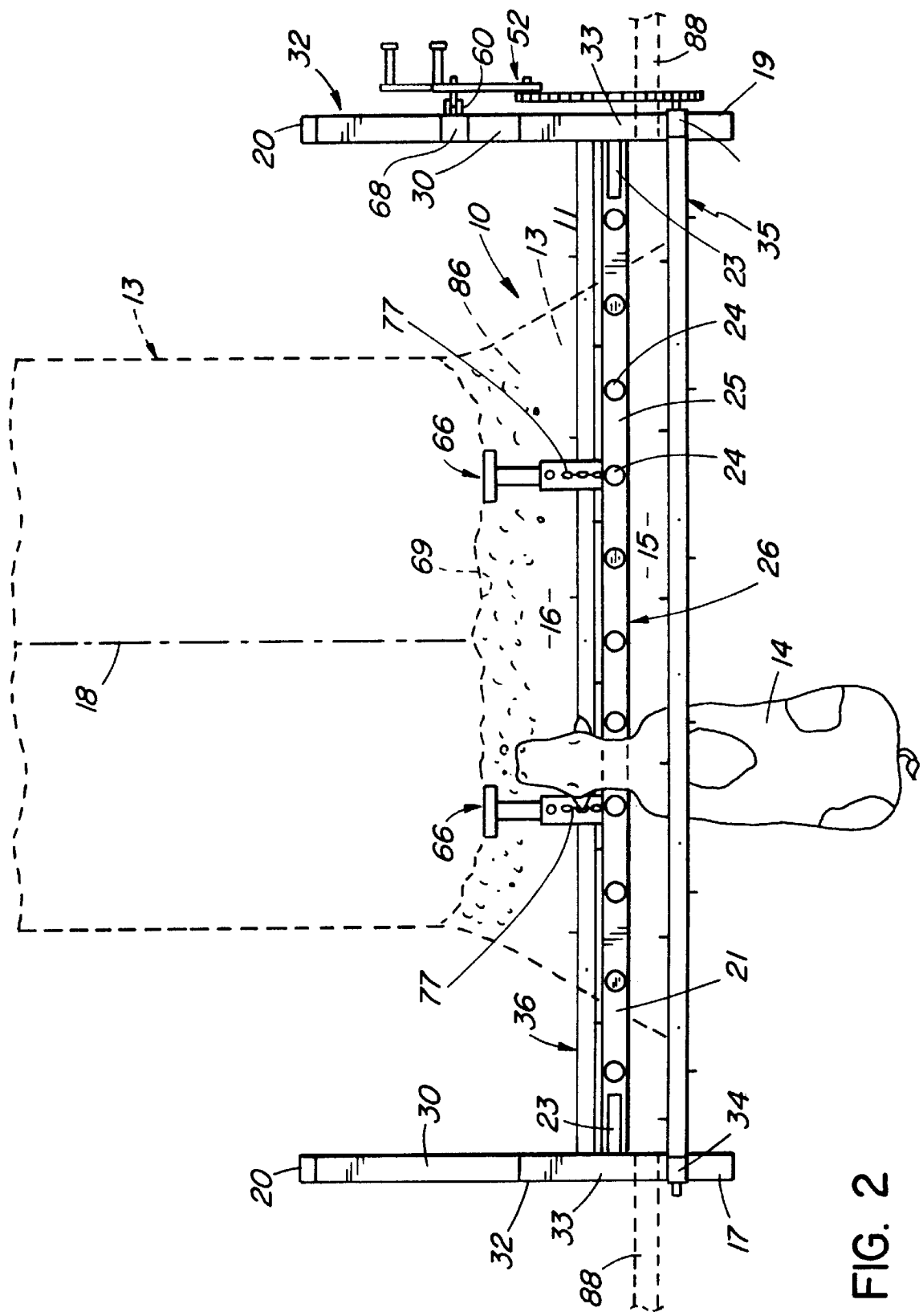
FIG. 2 is a plan view of the head gate, showing the feed storage bag in outline, and including modified features of the invention.
Figure 3:
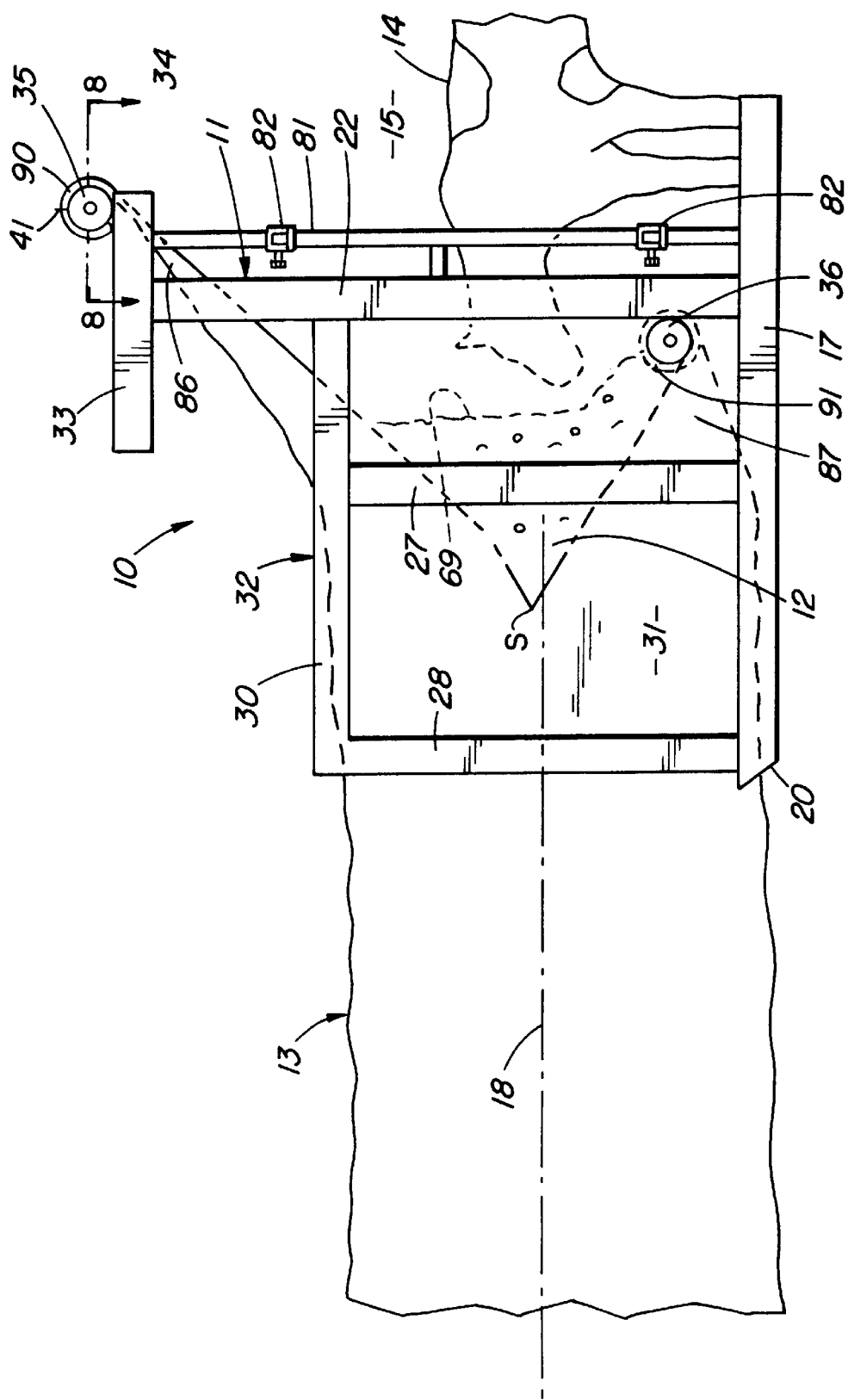
FIG. 3 is a side view of the head gate of FIG. 1.

In the accompanying drawings, the reference character 10 generally denotes a feed head gate of the present invention which includes a main framework 11 adapted to be located in front of an open end 12 of an elongated agricultural storage bag 13. The bag 13 is of the type which has been commercially available for a number of years and is formed of tubular flexible sheet plastic. The bag may be tightly packed with various cut crops or high moisture grain, and in which the crops, most commonly forage, forms a preserved ensilage, now more commonly called silage. The filled bag, which lies horizontal on the ground is substantially of extended cylindrical shape. As illustrated in FIGS. 2 and 3, the feed gate header 10 is disposed substantially normal to a longitudinal axis 18 of the bag.

When the feed head gate 10 is in use to allow the feeding of the livestock, usually cattle, as indicated at 14, directly from the open end 12 of the bag, it functions to maintain the livestock to remain on one side, hereinafter referred to as the rear side 15, of the framework while allowing the livestock feeding access to the opposite side, thereafter referred to as the front side 16 of the framework. The open end 12 of the bag 13 faces the front side 16. The framework 11 is mounted on ground engaging means which are shown as being in the form of a pair of skid members 17, 17 extending normal to and projecting forwardly of the framework 11. The skid members have upwardly and forwardly tapered forward ends 20, 20 so as to facilitate movement of the feed head gate in a direction towards the bag. When properly positioned the pair of skid members 17, 17 are generally parallel to the longitudinal axis 18 of the bag 13.

Figure 1:
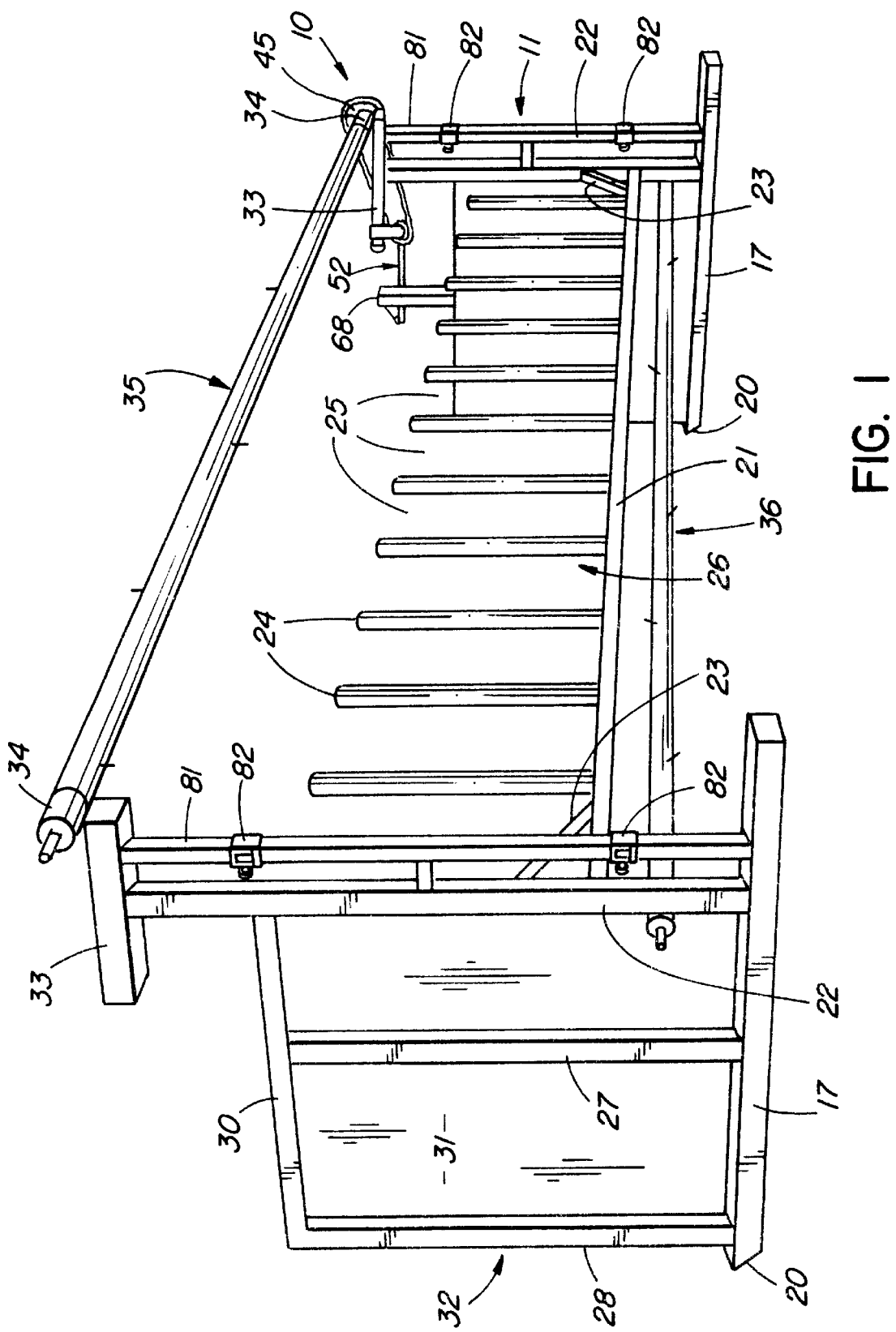
FIG. 1 is a side/rear end perspective view of the head gate of an embodiment of the present invention.

The framework 11 includes a main transverse beam 21 affixed at opposite ends to a pair of vertical columns 22, 22 which in turn are secured one each, such as by welding, to the top surfaces of the pair of skid members 17, 17 at a location relatively close to the rear ends of the skid members. The beam 21 is located above the skids 17, 17, as best seen in FIG. 1 so as to be spaced from the ground surface on which the skid members rest. Affixed to a top surface of the beam at opposite ends of the beam 21 are oblique bracing members 23, 23 which extend between the upper surface of the beam and the inside surfaces of the respective vertical columns 22, 22. Along the length of the beam 21 are equally spaced rigid upright members 24 firmly affixed to an upper surface of the beam. The spacing of the upright members 24 is such that each adjacent pair of the upright members provides an opening of sufficient width therebetween to allow the livestock, for which the feed gate feeder is designed, to reach through the opening but are prevented from moving forwardly through a transversely extending portion 26 of the framework. The opening providing portion 26 to be formed by beam 21 and the spaced rigid upright members 24.

A pair of additional vertical columns 27 and 28 are affixed at their lower ends to the upper surface of each skid member 17, the column 27 being spaced forwardly of the vertical column 22, and the column 28 being spaced still further forward of the column 27. The upper ends of columns 27 and 28 are jointed by a horizontal header member 30 which has a rear end extending to and being joined to a front side of the taller vertical column 27. The columns 22, 27 and 28, together with the skid member and header member 30 have affixed hereto a sheet metal member 31 so as to provide forwardly projecting protective end panels 32, 32 at opposite ends of the opening providing portion 26 of the framework. When the head gate 10 is placed in position, the end panels 32, 32 extend forwardly on either side of the open end 12 of the bag 13 as best seen in FIG. 2.

Attached to the upper end of the higher columns, which are in line with the transversely extending opening providing portion 26 of the framework, are horizontal beam portions 33, 32 which extend in the fore and aft direction. Carried in journal means 34, 34 is an upper roll means 35 forming part of a sheet plastic storage means of the head gate, the journal means being provided at opposite ends of the roll means 35 and attaching the roll means to the beam portions 33, 32 in a manner to permit the roll means to rotate relative to the framework 11. The roll means 35 is mounted at the rear of the beam portion and it therefore extends transversely across the head gate at an elevated position above the opening providing portion 26, and as shown, slightly to the rear of the vertical plane containing the opening providing portion 26.

A lower roll means 36, together with the upper roll means 35, forms a pair of like roll means which provide sheet plastic storage means of the head gate 10. The lower roll means 36 also extends across the width of the opening provided portion of the framework and has its ends mounted for rotation in journal means (not shown) connected to a lower part of the vertical columns 22, 22. Thus, the lower roll means 36 is disposed slightly forward of the vertical plane containing the opening providing portion 26 of the framework and at a lower level than the transverse beam 21, as best seen in FIG. 1.

Figure 8:
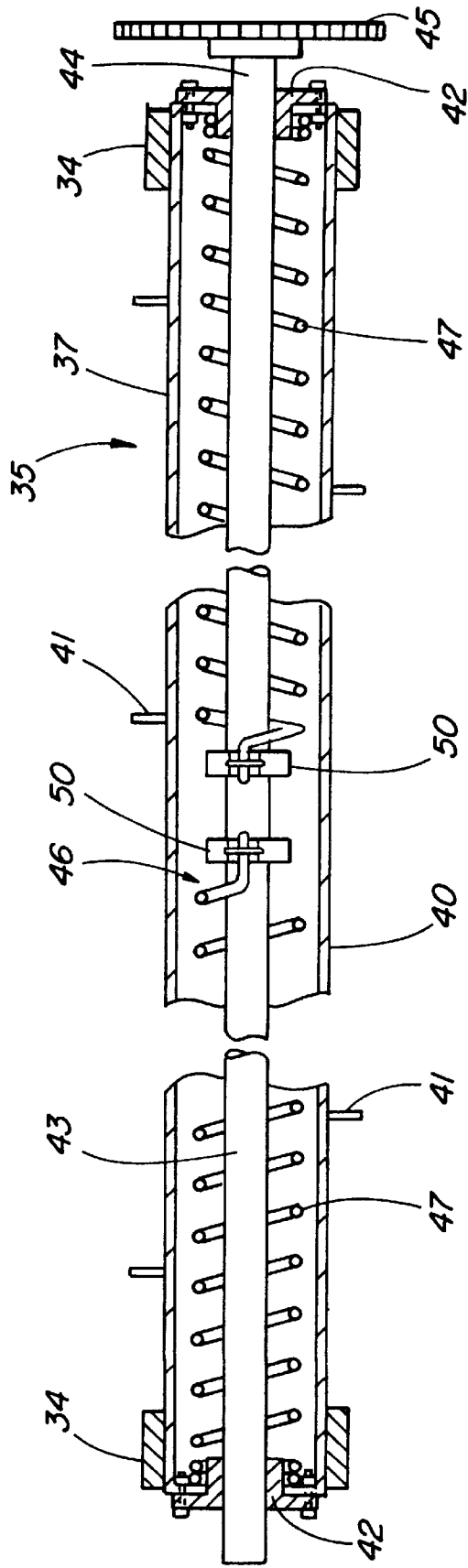
FIG. 8 is an enlarged cross-sectional view of a wind-up roll means of the present invention as seen from the line 8—8 of FIG. 3.

The pair of roll means 35, 36, may be of like structure, and a detailed description is now provided mainly with reference to FIG. 8. The roll means 35 includes an outer elongated cylindrical member 37 having an outer surface 40 onto which sheet plastic is wound in a manner which will be described further below. Preferably, the outer surface 40 is provided with a plurality of sharp, spike-like, projections 41 extending radially therefrom to act as snags for catching the sheet plastic when the sheet plastic is first wrapped on the outer surface 40. It is the cylindrical member 37 which is mounted for rotation in the journal means 34, 34. Affixed within inturned flanges at opposite ends of the cylindrical member 37 are sleeve forming members 42, 42 which function as bearings for rotatably mounting an internal elongated shaft 43 within the cylindrical member 37. The shaft 43, which forms part of a drive means for the roll means 35, extends entirely through the cylindrical member 37 and has a sprocket drivingly attached to an end 44 of the shaft 43 projecting out of one end of the cylindrical member 37. Connected between shaft 43 and the cylindrical member 37 within the cylindrical member is a resilient drive means 46 for transferring a rotational torque force from the shaft 43 to the cylindrical member. The resilient means is shown as including a pair of coil springs 47, 47 encircling the shaft 43 and contained within the interior of the cylindrical member 37. The coil springs 47, 47 are wound in opposite directions and have inner adjacent ends affixed to the shaft 43 at points intermediate the length of the shaft 43 by way of clamps 50, 50. The outer ends of the coil springs 47, 47 are affixed to the sleeve forming members 42, 42 at their outer ends so as to be in driving relation to the cylindrical member 37. The coil springs 47, 47 have opposite coil turns so that as the shaft is driven in a sheet winding direction of the outer cylindrical member 37, the resistance to turning of the cylindrical member 37 due to attached sheet plastic material will cause the springs to both wind up in a direction to store energy, which thereafter maintains tension on the sheet of plastic being wound thereon.

Figure 4:
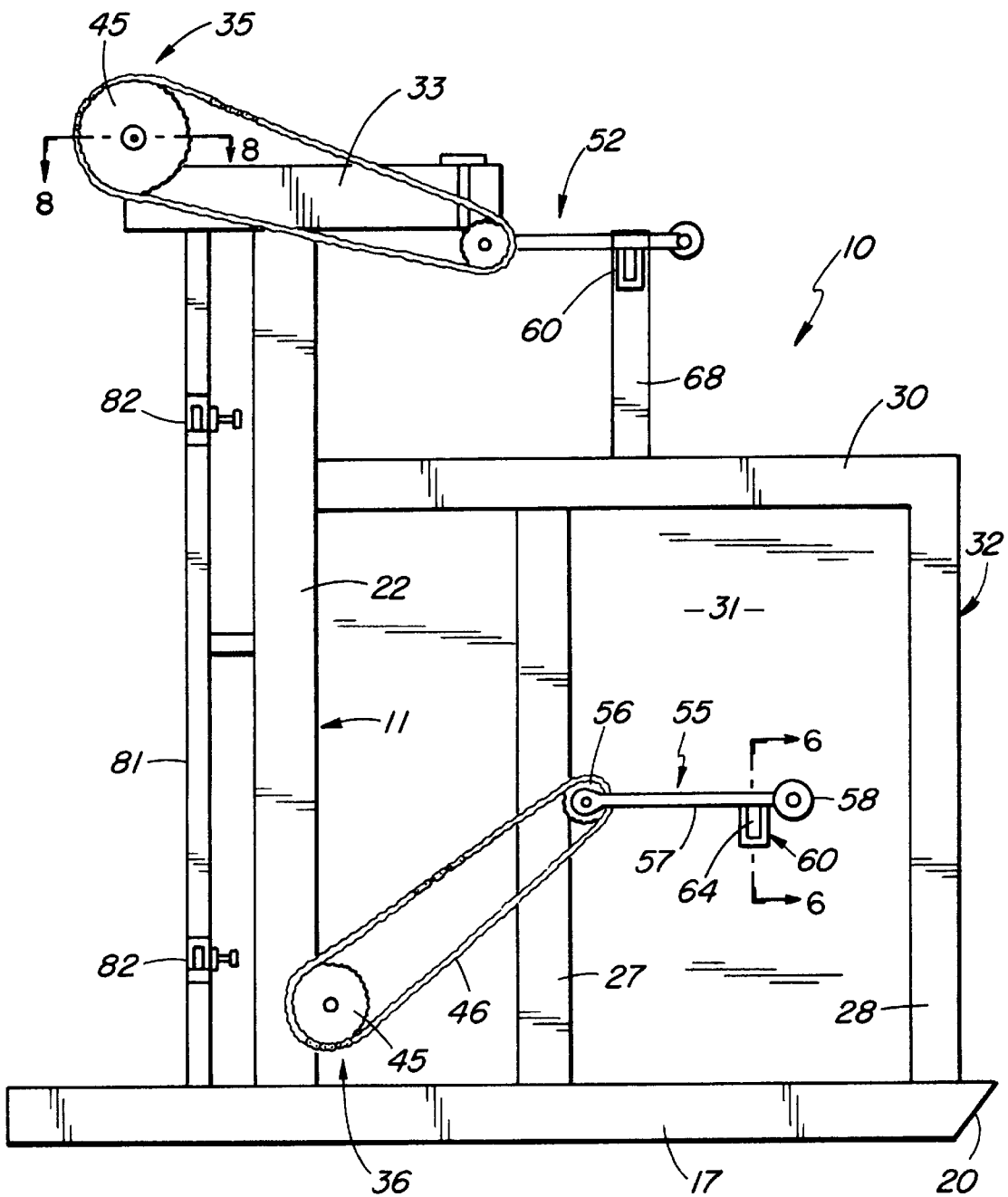
FIG. 4 is a side view of the head gate per se as seen from the right hand end in FIG. 2.

Looking at FIG. 4, it may be seen that the sprocket 45 can be selectively driven in a winding direction through a drive chain 51 which in turn is driven by a crank mechanism 52. As indicated, the lower roll means 36 is of a construction similar to that of upper roll means 35, the lower roll means 36 having a sprocket 53, a drive chain 54 and a crank mechanism 55 corresponding to sprocket 45, drive chain 51 and crank mechanism 52, respectively, of the drive means provided for the upper roll means 35. Referring now to the crank mechanism 55 it includes a sprocket 56 mounted on a shaft provided with bearing means (not shown) connecting the sprocket 56 to column 27 for permitting rotation of the sprocket relative to the framework 11. A crank arm 57 is affixed to the sprocket 56 so that rotation of the crank arm by an operator grasping a handle 58 of the crank mechanism can be achieved, will result in a turning of the sprocket 56 which in turn drives the sprocket 45 through drive chain 46.

It can be seen that when the crank is manually operated to turn the crank arm 57 in a counterclockwise direction, the lower sprocket rotates in the same rotational direction which would turn the internal elongated shaft within the outer cylindrical member of the lower roll means 36, and this would cause initial turning of the outer cylinder member of the lower roll member also in the same direction so as to achieve winding of the plastic sheet material thereon. However, as the plastic sheet becomes taut, further turning of the crank mechanism in the same direction causes the internal coil springs through which the turning torque force has been transmitted to the outer cylindrical roll to commence winding up in a fashion to store within the coil springs the energy being put into the drive means by way of the crank mechanism 55. As will become more readily apparent below, the stored energy within the coil springs will maintain the sheet material wound on the outer cylindrical member taut, and at the same time continue to take up slack as it develops in the plastic sheet from time to time.

Figure 6:
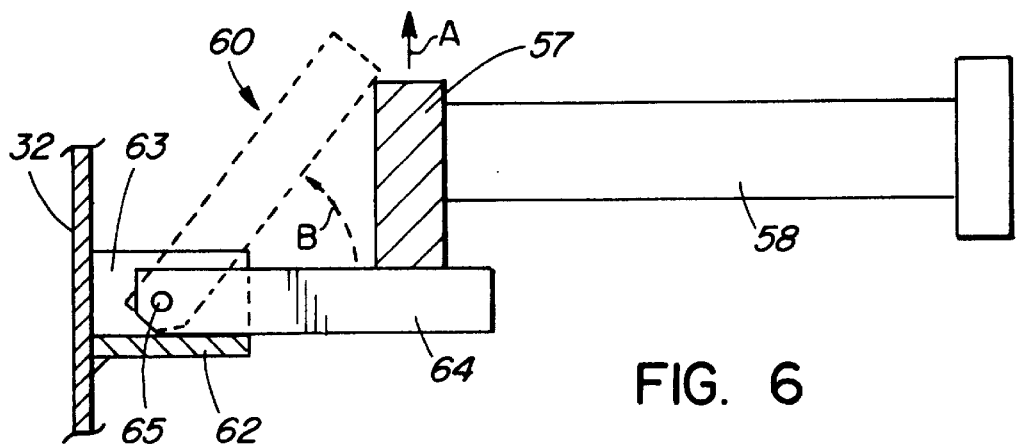
FIG. 6 is an enlarged cross-sectional view of a brake means which is part of a drive means in the head gate as seen from the line 6—6 of FIG. 4.
Figure 7:
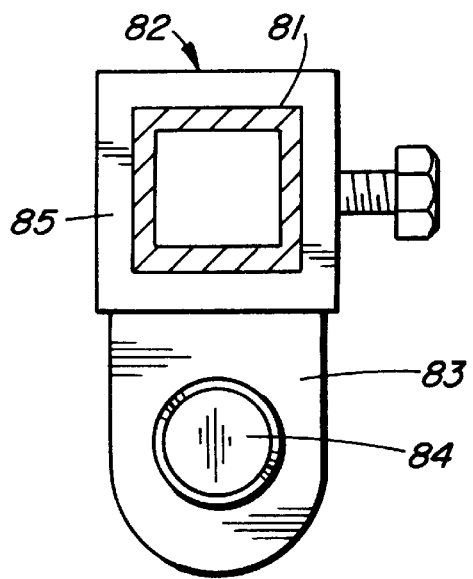
FIG. 7 is an enlarged cross-sectional view of a hinge means provided on the head gate as seen from the line 7—7 of FIG. 3.

It is necessary, however, to provide a form of a brake means, which is indicated at 60 in relation to both crank mechanism 52 and 55 so as to prevent the crank arms from freely unwinding and thus releasing the stored wind-up energy in the upper and lower roll means when the crank handle 58 is released by the operator. The brake means 60 may be in a form other than that shown, such as a releasable dog mechanism which co-operates with either of the sprockets 45 and 56 or a gear associated therewith. As shown in one embodiment of a brake means associated with crank mechanism 55, there is provided a bracket 61 of U-shaped cross-section, affixed at an inner end to end panel 32, the U-shaped bracket thus providing a bottom wall 62 and side walls 63 (FIG. 6). A dog 64 is pivotally mounted between the side walls 63 by a pivot pin 65. The dog extends outwardly into the path of the crank arm 57 so that as the crank is rotated in the counterclockwise direction as indicated by arrow A in FIG. 6, it engages the bottom of dog 64, raising the dog out of its path as indicated by arrow B in FIG. 6. However, as the winding being carried out by the crank mechanism 55 is terminated, it is allowed to return to a position to rest on top of dog 64 which cannot pivot downwardly out of its way due to the engagement of a bottom surface of the dog with the bottom wall 62 of the bracket 61. The brake means 60 associated with the crank mechanism 52 included in the drive means for the upper roll means 35 is of the same construction and is supported by a short column 68 affixed to the top of header member 30.

Figure 5:
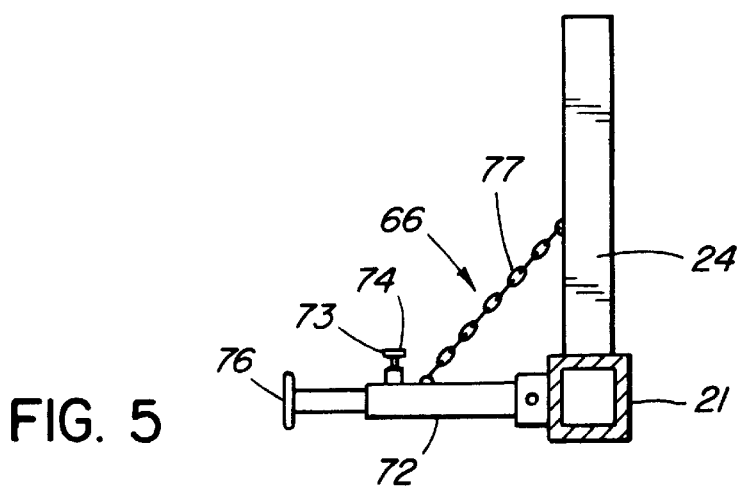
FIG. 5 is a cross section view showing hold-back means as seen from line 5—5 of FIG. 2.

In the embodiment of the invention as illustrated in FIG. 2, and as more fully shown in FIG. 5, there may be provided an adjustable stop means 66 for controlling the travel of the head gate 10 in its forward direction, i.e. towards the open end of the bag 13. The adjustable stop means 66 is shown in the form of a pair of adjustable stop legs 67, 67 of identical form affixed at rear ends thereof to the main transverse beam 21 of the framework 11. The stop legs are spaced on opposite sides of a mid point of the opening providing portion 26 of the framework, but are being positioned a distance in from the opposite ends thereof. The stop legs 67, 67 are disposed to engage a face 69 of the compacted feed within the bag forward of the front side 16 of the head gate 10 so as to thereby resist the movement of the head gate and thereby limit the access of the livestock to such feed. Each stop leg 67 includes a mounting bracket 70 secured to main beam 21 and having pivotally mounted therein by pivot pin 71 a leg portion 72. The leg portion having an inner base portion 73, which is of tubular form, and an outer or extension portion 74 telescopically received in the base portion. A lock means 74 is provided to allow adjustment of the amount of extension of the outer portion 74 out of the base portion 73, the lock means being shown in the form of a set of screw 75 threaded within the base portion 73 and engageable at an inner end thereof with the outer portion 74 or with notches formed in the outer portion. An outer end of the outer portion 73 of each stop leg 76 is provided with an enlargement or foot portion which may be in the form of a flat plate 76 welded to the outer portion for thereby providing a larger bearing area against the compacted feed. Because the stop legs 67 are pivotally connected to the framework it is possible to adjust vertically the position of the outer end by selecting the length of a flexible means, such as a support chain 77, extending obliquely between the adjacent upright members 24 and the base portion 72 of the stop leg. Furthermore, such an arrangement allows the stop leg to be moved out of its active position, if desired, such as to allow adjustment without the leg carrying a compression load as it does when in engagement with the feed.

With the use of the head gate 10 of the present invention, it would be customary to run temporary fences along both sides of and parallel to the bag 13 for its entire length so that the livestock may only approach the head gate by walking up to it from the rear. There may be, for example, a plurality of such bags lying side by side in a slightly spaced arrangement parallel to each other. In this case wing gates 80, 80 (FIG. 2) may be used to prevent passage of the livestock between such fences and either end of the head gate. For easy mounting of the wing gate there may be provided adjustable hinge means for easy mounting of inner ends of such wing gates to the head gate. Extending between an upper surface of each skid member 17 and the rear part of each beam portion 33 is a post 81. A pair of hinge members 82, 82 and mounted on each post 81, each hinge member 82 having a base portion which receives and is dimensioned to slide up and down on the post. Each hinge member has an outwardly portion 83 carrying an upwardly projecting stud portion 84 for receiving a bracket of the wing gate 80. The base portion 85 has a set screw means 86 for locking the hinge member in a selected vertical position, thereby allowing for different types of gates to be mounted or for vertical adjustment to compensate for various conditions, such as the buildup of snow.

In use the head gate 10 would be skidded to a position with the front side 16 facing the open end of a bag 13. The setting-up may include the installation of wing gates as described above. A pair of slits are then cut from the free end of the bag along either side of the bag to a point such as shown at S in FIG. 3, thus forming immediately in front of the front side 16 of the opening providing portion 26 of the framework separated, upper and lower sheets 86 and 87 of plastic. The free ends of upper and lower such sheets 86 and 87, which are, of course, continuous with the length of the tubular form of the sheet material forming the bag, are brought by hand into contact with the upper and lower rolls means 35 and 36, respectively, and initially snagged thereon by pushing the sheet plastic against the outer surface, i.e. surface 40 of the elongated cylindrical member 37 in the case of the upper roll means 35, to thereby force the projection 41 through the sheet of plastic. Accordingly, on initially individual turning of the crank mechanisms 52 and 55, the cylindrical member 37 of the upper roll means and the corresponding member of lower roll members are separately rotated to initially take up the slack in the upper and lower sheets 86 and 87. Continued turning of each crank mechanisms results in energy stored in the coil springs within the roll means so as to maintain the upper and lower sheets 86 and 87 taut.

The end of compacted feed within the bag 13 is thus exposed at the front of the opening providing portion 26 of the framework, and the livestock are able to reach through from the rear of the framework and consume the feed which is kept covered from above by the taut upper sheet 86. As feed falls from the compact part thereof it lands on the lower sheet 87 from which location it can be grabbed by the livestock without the feed becoming dirty and/or wasted. After a period of time, depending on the diameter of the bag and the number of livestock being fed, as the reach by the livestock becomes more strenuous due to the receding face of the compacted feed, the entire head gate is pushed forward towards the end of the bag by the livestock. As this happens, due to the stored energy in the coil springs, the outer cylindrical member of the roll means is driven to take up the slack of the upper and lower sheets 86 and 87, thus automatically forming a wound up storage of the two sheets on the roll means as indicated at 90 and 91.

Under certain conditions, it may be found that the advance of the head gate 10 is excessive, and in such circumstances, it is possible to limit the total forward advance by chaining the framework to pegs driven into the ground to the rear of the head gate, and initially leaving some slack in the chains which eventually will be taken up to limit further advance. With such an arrangement, it is required that every day or two, the chain must be reset to provide more slack. As an alternative, however, it is possible to utilize adjustable stop means 66 to maintain a distance between the opening providing portion 26 of the framework and the fresh face of the stored feed. With this arrangement as well, it may be necessary to occasionally break away the compacted feed in front of the plate 76 of the stop means 67, to permit the head gate to advance. This may be done, when it is necessary to attend to the cranking mechanism 52 and 55, which under normal conditions would be done every day or two. At the same time the slits on either side of the bag are extended a short distance.

Feeding from each bag is thus possible with a minimum amount of maintenance for over an extended period of time. There results substantially no wastage and the feed is always presented in a fresh form. When the feeding from a bag is complete, the plastic sheets then constituting the remains of the original bag 13 can be pulled from the roll means and handled in an orderly manner for disposal.

Various modifications can be made to the invention as shown and described above. For example electrical or hydraulic power means could be provided for driving the roll winding means, and alternative arrangements could be utilized for driving the roll means in a manner to maintain a stored energy for rotating the outer cylindrical member automatically so as to maintain the sheets of plastic taut. However, the disclosed arrangements are of an economical design requiring very little routine maintenance. Nevertheless any such modification which would be obvious to those skilled in the art are believed to be within the spirit of the invention as defined in the appending claims.

What I claim is:

1. A feed head gate for allowing livestock to feed from an open end of an elongated agricultural storage bag of the type formed of tubular flexible sheet plastic;

said feed head gate comprising:
    an elongated framework;
    said framework having ground engaging means for mounting said framework in front of an open end of said bag and transverse to a longitudinal axis of said bag for preventing free passage of the livestock from a rear side of said framework to said open end of said bag;
    said framework having a portion thereof defining a plurality of openings for allowing the livestock to reach through said framework from said rear side exposed to the livestock to a front side thereof facing said open end of said bag;
    a sheet plastic storage means mounted on said framework and extending at least a portion of the length of said framework; and
    drive means for activating said storage means to thereby gather sheet plastic of said bag as feed is consumed from the open end of said bag.

2. A feed head gate as defined in claim 1, wherein:
said storage means includes at least one elongated roll means mounted for rotation on said framework and extending transversely to said longitudinal axis of said bag, and
said drive means includes rotating means for turning said roll means in a winding direction to thereby wrap said sheet plastic thereon.

3. A feed head gate as defined in claim 1, wherein:
said storage means includes a pair of roll means mounted for rotation on said framework,
an upper one of said roll means being disposed above said opening defining portion of said framework,
a lower one of said roll means being disposed below the opening defining portion of said framework,
each of said roll means having a longitudinal axis thereof extending normal to said longitudinal axis of said bag,
whereby said bag may be slit longitudinally on either side immediately in front of said feed head gate to form separated upper and lower sheets of plastic,
said upper sheet being wound on the upper roll means
said lower sheet being wound on the lower roll means, and
whereby feed at the open end of said bag between said upper and lower sheets is exposed at said front side of said framework.

4. A feed head gate as defined in claim 3, wherein:
each of said roll means includes an elongated cylindrical member having an outer surface,
said cylindrical member being journalled on said framework for rotation thereon,
whereby on rotation of each of said cylindrical members one each of said sheets of plastic are separately wound on the outer surface of each cylindrical member.

5. A feed head gate as defined in claim 4 wherein:
said cylindrical member is hollow, and
said drive means includes:
an elongated shaft journalled for rotation coaxially within said cylindrical member,
means for rotating said shaft within said cylindrical member, and
means for transferring a rotational torque force from said shaft to said cylindrical member.

6. A feed head gate as defined in claim 5, wherein:
said means for transferring said rotational torque force from said shaft to said cylindrical member includes resilient means, whereby
said cylindrical member is continually biassed to a plastic sheet winding condition to thereby maintain tension on said sheet of plastic.

7. A feed head gate as defined in claim 6, wherein:
said resilient means includes coil spring means encircling said shaft and being affixed at one end to said shaft and being affixed at an opposite to an interior part of said cylindrical member,
said coil spring means having a coil turn for storage of energy as said shaft is turned in the same rotational direction as said winding direction of said cylindrical member.

8. A feed head gate as defined in claim 7, wherein:
said shaft extends the full length of the cylindrical member, and wherein
said coil spring means includes a pair of coil springs of opposite winds, each of said coil springs having outer ends connected to opposite ends of said cylindrical member and inner ends connected to said shaft intermediate opposite ends of said shaft.

9. A feed head gate as defined in claim 8, wherein:
at least one end of said shaft extends beyond a corresponding end of said cylindrical member, and wherein
said drive means further comprises:
means connected to said at least one end for selectively rotating said shaft in a spring winding direction, and
brake means for preventing rotation of said shaft in an opposite direction.

10. A feed head gate as defined in claim 9, wherein
the means for selectively rotating said shaft includes a manually operable crank disposed at one end of said elongated frame work.

11. A feed head gate as defined in claim 10, wherein said crank is rotatable maintained on said framework, and
the means for selectively rotating said shaft includes
a first sprocket fixedly attached to said one end of said shaft,
a second sprocket attached for rotation with said crank, and
a chain drive connecting the two sprockets for transmitting rotational drive from second sprocket to said first sprocket.

12. A feed head gate as defined in claim 4, wherein said outer surface of said cylindrical member is provided with a plurality of projections arranged to provide snags for catching said sheets of plastic.

13. A feed head gate as defined in claim 3, wherein:
said pair of roll means are disposed on substantially parallel longitudinal axes, and
said opening defining portion of said framework includes:
a main horizontal transverse beam disposed above the ground and extending between opposite ends of said framework, and
a plurality of rigid upright members affixed to lower ends of said beam and being spaced to provide said openings therebetween.

14. A feed head gate as defined in claim 13, wherein
said framework includes vertical columns at opposite ends of said beam and affixed thereto,
said columns extending above said upright members and providing mounting means for the upper roller means,
said upper roller being disposed on a transverse axis located higher than said opening defining means and on said rear side thereof.

15. A feed head gate as defined in claim 14, wherein
said lower roller is disposed on a transverse axis on said front side of said opening defining means below, and adjacent to said beam.

16. A feed head gate as defined in claim 13 and further including:
stop means attached to the opening defining portion of said framework and extending forward thereof for engagement with a face of compacted feed exposed within said open end of said bag to thereby limit movement of said framework towards said feed.

17. A feed head gate as defined in claim 16, wherein
said stop means includes a pair of stop legs connected to said beam and spaced on opposite sides of a midpoint of said beam.

18. A feed head gate as defined in claim 17, wherein
each stop leg includes:
a bracket affixed to said front side of said beam,
pivot means connecting a rear end of said stop leg to said bracket, and
elongated flexible means connected at one end to said stop leg at a point forward of said pivot means and at another end to said framework above said pivot means,
whereby the height of the outer end of said stop leg may be adjusted by selecting the length of said flexible means.

19. A feed head gate as defined in claim 17, wherein
each stop leg includes:
rear and front sections with one section being telescopically received within the other,
said rear section being attached to said beam, and
lock means for permitting adjustment of the amount of telescoping of the front section relative to the rear section,
whereby an overall length of said stop leg can be selectively set.

20. A feed head gate as defined in claim 19, wherein
each stop leg includes a foot of larger cross section than that of said leg attached to a front end of said front section to thereby increase the bearing surface for engagement with said face of compacted feed.

21. A feed head gate as defined in claim 1, and further comprising:
a pair of end panels,
one each of said pair of panels being disposed at an opposite end of said defining portion of said framework defining said openings and extending forwardly of said front side of said framework normal to said opening defining portion of said framework so as to be substantially parallel to the longitudinal axis of said bag on opposite sides of said bag.

22. A feed head gate as defined in claim 21, wherein:
said ground engaging means includes a pair of skid members, one each of said skid members being disposed at an opposite end of said opening defining portion of said framework and extending normal thereto so as to project in a direction parallel to the longitudinal axis of said bag.

23. A feed head gate as defined in claim 21, and further including, a pair of vertical posts, one each disposed adjacent a rear edge of said end panels, and hinge means mounted on said posts for having wing gates connected thereto extending outwardly from either end of said framework.

24. A feed head gate as defined in claim 23, wherein:

said hinge means have adjustment means for permitting vertical settings of said hinge means.

* * * * *

UNITED STATES PATENT AND TRADEMARK OFFICE
CERTIFICATE OF CORRECTION

PATENT NO : 6,039,002
DATED : March 21, 2000
INVENTOR(S): Douglas R. STRANKMAN

It is certified that error appears in the above-identified patent and that said Letters Patent is hereby corrected as shown below:

On the title page, insert the following item:

--[30] Foreign Application Priority Data

Nov. 10, 1998  Canadian Patent Application No. 2,253,305--

Signed and Sealed this

Second Day of January, 2001

Attest:

Attesting Officer

Q. TODD DICKINSON
Commissioner of Patents and Trademarks